US008718719B2

(12) United States Patent
Guthrie et al.

(10) Patent No.: US 8,718,719 B2
(45) Date of Patent: *May 6, 2014

(54) SYSTEM AND METHOD FOR MANAGING BATTERY SLUMP DURING WIRELESS COMMUNICATIONS USING SIGNAL TRIGGERED VOLTAGE MONITORING

(75) Inventors: Martin George Albert Guthrie, Moffat (CA); Richard C. Madter, Puslinch (CA); Dusan Veselic, Oakville (CA); Christopher Simon Book, Waterloo (CA); Kent Arnold Nickerson, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 67 days.

This patent is subject to a terminal disclaimer.

(21) Appl. No.: 13/246,204

(22) Filed: Sep. 27, 2011

(65) Prior Publication Data

US 2012/0021709 A1 Jan. 26, 2012

Related U.S. Application Data

(63) Continuation of application No. 11/549,762, filed on Oct. 16, 2006, now Pat. No. 8,032,189.

(60) Provisional application No. 60/726,242, filed on Oct. 14, 2005.

(51) Int. Cl.
*H04M 1/00* (2006.01)
*H04B 1/38* (2006.01)

(52) U.S. Cl.
USPC .......... 455/574; 455/522; 455/69; 455/414.1; 340/660; 340/428; 340/426.15; 340/539.3; 379/27.05; 379/29.03; 379/29.04

(58) Field of Classification Search
USPC .............................................. 455/573, 414.1
See application file for complete search history.

(56) References Cited

U.S. PATENT DOCUMENTS 4,761,824 A * 8/1988 Saito .......................... 455/127.1
5,321,639 A * 6/1994 Krishnamoorthy et al. ...... 708/7

(Continued)

FOREIGN PATENT DOCUMENTS

| CA | 2625685 A1 | 4/2007 |
|---|---|---|
| CA | 2625685 C | 4/2012 |

(Continued)

OTHER PUBLICATIONS

Patent Cooperation Treaty—International Searching Authority, Written Opinion of the International Searching Authority, Feb. 9, 2007, WIPO.

(Continued)

*Primary Examiner* — Quan M Hua
(74) *Attorney, Agent, or Firm* — Bereskin & Parr LLP/S.E.N.C.R.L., s.r.l.

(57) ABSTRACT

A system and method for managing battery slump in a battery-powered communications device including: an input configured for receiving battery voltage level information; an output configured for sending a signal for terminating a transmission; and a controller connected to the input and the output and configured to receive the battery voltage level information from the input; monitor the battery voltage level information; and send a signal via the output to terminate a transmission if the battery voltage level information crosses a predetermined threshold during the transmission. In particular, the system and method may further include an input connected to the controller and configured for receiving a signal indicating when a transmission is beginning or occurring and the controller is further configured to receive and monitor the battery voltage level information only when the transmission is occurring.

23 Claims, 7 Drawing Sheets

(56) References Cited

U.S. PATENT DOCUMENTS

| | | | |
|---|---|---|---|
| 5,592,293 A * | 1/1997 | Garfinkle | 356/450 |
| 5,600,226 A * | 2/1997 | Falcon | 320/129 |
| 5,896,261 A | 4/1999 | Black | |
| 6,018,232 A | 1/2000 | Nelson et al. | |
| 6,114,831 A * | 9/2000 | Attimont et al. | 320/106 |
| 6,172,483 B1 * | 1/2001 | Champlin | 320/134 |
| 6,256,520 B1 | 7/2001 | Suzuki | |
| 6,330,455 B1 * | 12/2001 | Ichihara | 455/522 |
| 6,721,580 B1 * | 4/2004 | Moon | 455/574 |
| 6,782,208 B1 * | 8/2004 | Lundholm et al. | 398/135 |
| 6,856,654 B1 | 2/2005 | Carkner et al. | |
| 8,032,189 B2 * | 10/2011 | Guthrie et al. | 455/574 |
| 2001/0011032 A1 | 8/2001 | Suzuki | |
| 2001/0012774 A1 | 8/2001 | Muramatsu | |
| 2001/0020834 A1 * | 9/2001 | Berkowitz et al. | 318/272 |
| 2001/0048292 A1 | 12/2001 | Wahl | |
| 2002/0128049 A1 | 9/2002 | Davis | |
| 2005/0107044 A1 | 5/2005 | Bae | |
| 2008/0014997 A1 | 1/2008 | Guthrie et al. | |

FOREIGN PATENT DOCUMENTS

| | | |
|---|---|---|
| CN | 1209714 | 3/1999 |
| CN | 1762171 | 4/2006 |
| CN | 101326478 A | 12/2008 |
| EP | 1087536 A1 | 3/2001 |
| EP | 1938171 A4 | 1/2009 |
| GB | 2292503 | 2/1996 |
| GB | 2326062 * | 9/1998 |
| GB | 2326062 | 12/1998 |
| GB | 2375922 | 11/2002 |
| WO | 98/36483 | 8/1998 |
| WO | 2004105417 A1 | 12/2004 |
| WO | 2007041870 A1 | 4/2007 |

OTHER PUBLICATIONS

Patent Cooperation Treaty—International Searching Authority, International Search Report, Feb. 9, 2007, WIPO.
Texas Instruments, TPS65800 Preview, Integrated Single-Cell Lithium-Ion Battery and Power Management IC, http://focus.ti.com/docs/prod/folders/print/tps65800.html, including Spec sheet dated Sep. 14, 2005.
European Search Report for related European Patent Application No. 06790852.5 dated Dec. 16, 2008.
International Preliminary Report on Patentability for related International Patent Application No. PCT/CA2006/001698 dated Jan. 24, 2008.
Chinese Office Action dated Sep. 18, 2009, Chinese Patent Application No. 200680046493.6, unofficial translation provided.
Canadian Office Action dated Jul. 22, 2010, CA Patent Application No. 2,625,685.
Chinese Notification of Grant dated Mar. 12, 2010, Chinese Patent Application No. 200680046493.6.
Canadian Office Action Response, Canadian Patent Application No. 2,625,685, dated Jan. 18, 2011.
Response to Examination Report, European Patent Application No. 06790852.5, dated Jul. 24, 2012.
Related U.S. Appl. No. 11/549,762, "System and Method for Managing Battery Slump During Wireless Communications Using Signal Triggered Voltage Monitoring", now issued as U.S. Patent No. 8,032,189, filed Oct. 16, 2006.
Canadian Notice of Allowance, Canadian Patent Application No. 2,625,685, dated Sep. 30, 2011.
Examination Report, European Patent Application No. 06790852.5, dated Mar. 23, 2012.
United States Office Action corresponding to U.S. Appl. No. 11/549,762, dated Dec. 9, 2008.
United States Office Action Response corresponding to U.S. Appl. No. 11/549,762, dated Mar. 9, 2009.
United States Final Office Action corresponding to U.S. Appl. No. 11/549,762, dated May 15, 2009.
Applicant summary of interview with Examiner corresponding to U.S. Appl. No. 11/549,762, dated Jul. 15, 2009.
Examiner Interview Summary Record corresponding to U.S. Appl. No. 11/549,762, dated Jul. 23, 2009.
United States Office Action Response corresponding to U.S. Appl. No. 11/549,762, dated Aug. 14, 2009.
United States Office Action corresponding to U.S. Appl. No. 11/549,762, dated Sep. 30, 2009.
United States Office Action Response corresponding to U.S. Appl. No. 11/549,762, dated Dec. 15, 2009.
United States Final Office Action corresponding to U.S. Appl. No. 11/549,762, dated Mar. 4, 2010.
United States Office Action Response corresponding to U.S. Appl. No. 11/549,762, dated May 4, 2010.
United States Office Action corresponding to U.S. Appl. No. 11/549,762, dated Jul. 21, 2010.
United States Office Action Response corresponding to U.S. Appl. No. 11/549,762, dated Oct. 13, 2010.
United States Office Action corresponding to U.S. Appl. No. 11/549,762, dated Dec. 22, 2010.
United States Office Action Response corresponding to U.S. Appl. No. 11/549,762, dated Mar. 22, 2011.
United States Notice of Allowance corresponding to U.S. Appl. No. 11/549,762, dated Jun. 2, 2011.
Reply to Exam Report corresponding to EP patent application No. 06790852.5, dated Feb. 13, 2009.
Document relating to U.S. Appl. No. 11/549,762, dated Jul. 9, 2009 (Letter Requesting Interview with Examiner).
Document relating to U.S. Appl. No. 11/549,762, dated Aug. 14, 2009 (Request for Continued Examination).
Document relating to U.S. Appl. No. 11/549,762, dated May 4, 2010 (Request for Continued Examination).
Document relating to Indian Application No. 3096/DELNP/2008, dated Aug. 2, 2013 (Office Action).
Document relating to Chinese Application No. 200680046493.6, dated Jan. 8, 2010 (Office Action Response).
Document relating to Chinese Application No. 200680046493.6, dated Jul. 7, 2010 (Certificate of Invention Patent).
Document relating to Indian Application No. 3096/DELNP/2008, dated Jan. 30, 2014 (Office Action Response).

* cited by examiner

SYSTEM AND METHOD FOR MANAGING BATTERY SLUMP DURING WIRELESS COMMUNICATIONS USING SIGNAL TRIGGERED VOLTAGE MONITORING

CROSS-REFERENCE TO RELATED APPLICATIONS

This application is a continuation of U.S. patent application Ser. No. 11/549,762, filed Oct. 16, 2006, which is a regular application of U.S. Provisional Patent Application No. 60/726,242, filed Oct. 14, 2005. The entire contents of U.S. patent application Ser. No. 11/549,762 and U.S. Provisional Patent Application No. 60/726,242 are hereby incorporated by reference.

FIELD

The embodiments described herein relate generally to a system and method for managing battery slump and, more particularly, relate to a system and method for monitoring battery slump and managing a mobile communications device based on battery slump.

BACKGROUND

Mobile communication devices such as mobile phones, personal data assistants, and the like are generally powered by internal means, such as an internal battery pack. The internal battery pack is an assembly of one or more batteries/cells that typically have a predetermined capacity. Typically, battery packs can have different termination voltages (associated with full charge) such as 4.2 V and 4.4 V, for example, as well as different charging/discharging characteristics.

As is well understood, the battery pack needs to have a sufficient capacity to operate the mobile communication device under a variety of conditions, including handling the comparatively greater power requirements encountered when transmitting a signal wirelessly. In transmitting a wireless signal, a mobile communication device generates an internal data signal that is transmitted using a radio transmitter. The data signal is typically a comparatively low frequency signal that is generally referred to as a baseband signal. The baseband signal is mixed with a carrier signal having a substantially higher frequency to produce a high (e.g. radio) frequency transmission signal. The transmission signal is amplified in one or more stages of an output power amplification block and then applied to a radio antenna to be radiated. The amplified transmission signal needs to be sufficiently powered so that it is received with appropriate strength and little or no data loss at a remote base station or another communication device.

The amplification stages of the output power amplification block may include a pre-amplification stage and a power amplification stage for producing the amplified transmission signal. The amplification level of either the pre-amplification stage or the power amplification stage may generally be adjusted depending on the power required for a particular type of signal. The power amplification stage is powered so that it can produce an amplified transmission signal that has an appropriate instantaneous maximum power for the required transmission.

In wireless communications, there are many cases where the amplified transmission signal is required to have a large dynamic range of power levels. This range is needed in order to accommodate a signal that has a high peak-to-average power ratio (PAPR) or to accommodate different types of signals that may have different desired power levels and different PAPRs. In these cases, the power amplification stage must be capable of generating an amplified transmission signal such that the highest instantaneous power level desired for any data type or data rate of the baseband data that is present in the amplified transmission signal is always accommodated without saturation or undue distortion. In conventional power management schemes, the maximum instantaneous power increases with available power supply voltage, such that insufficient supply voltage may induce amplifier saturation and excessive distortion. As such, the power amplification stage is typically provided with a power supply voltage that is sufficient for accommodating a specified maximum instantaneous power level. For lower power levels, the excess power supplied to the power amplifier is unnecessary and is generally dissipated as heat or otherwise lost.

In wireless devices that are using a battery, the supply current requirements of the amplifier can constitute a heavy drain on the battery. For example, a GSM transmit pulse has a very high current drain on the battery for a time of ~500 usec and the current can reach ~2 Amps. Such a pulse causes the voltage appearing at the power amplifer stage (PA) to "slump" because of battery internal source resistance (ISR) and other printed circuit board (PCB) trace/component resistances.

This battery voltage slump has led to standards that require the PA to operate with a minimum voltage requirement. These standards include, for example, FCC regulations as well as GSM standards with regard to radiated emissions. However, it is difficult to accurately choose/set the minimum voltage level of the PA, because battery ISR can have a wide range depending on the age of the battery, the temperature at which the battery is operating and the like. For example, the worst case slump for cold temperatures and an aged battery can be 2-3 times the slump of a newer battery at indoor temperatures. Thus, in order to design a mobile device that is compliant with standards, the worst case slump must be considered and a lower PA operating voltage must generally be assumed in order to meet the "worst case scenario". The use of a lower PA operating voltage sacrifices efficiency and available power because in conditions where battery slump is better than the worst case, there will be excess power that is dissipated. This results in shorter battery life and lower production yields.

As such, there is a need in the art for an improved method of monitoring and managing battery slump voltage in mobile devices.

BRIEF DESCRIPTION OF THE DRAWINGS

For a better understanding of the embodiments described herein and to show more clearly how they may be carried into effect, reference will now be made, by way of example only, to the accompanying drawings which show the exemplary embodiments and in which:

FIG. 3 is a block diagram of an exemplary embodiment of a node of a wireless network that the mobile communication device of FIG. 1 may communicate with;

These and other features of the exemplary embodiments are described in more detail below.

DESCRIPTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

According to a first aspect of the embodiments herein, there is provided a system for managing battery slump in a battery-powered communications device including: an input configured for receiving battery voltage level information; an output configured for sending a signal for terminating a transmission; and a controller connected to the input and the output and configured to receive the battery voltage level information from the input; monitor the battery voltage level information; and send a signal via the output to terminate a transmission if the battery voltage level information crosses a predetermined threshold during the transmission.

In a particular case, the system may further include an input connected to the controller and configured for receiving a signal indicating when a transmission is beginning and the controller is further configured to receive the battery voltage level information only when the transmission is occurring.

In this case, the signal indicating when a transmission is beginning may be an amplifier enable signal.

Also in this case, the controller may be further configured to delay the monitoring of the battery voltage level information for a predetermined time after receiving the signal indicating when a transmission is beginning.

In another particular case, the controller may be configured to send the signal to terminate the transmission without powering down the communication device.

In yet another particular case, the controller may be configured to receive battery voltage level information by receiving periodic voltage readings and to monitor the battery voltage level information by averaging the voltage readings.

In still yet another particular case, the controller may be further configured to notify a user of the communication device of the termination of transmission and reason for the termination.

According to another aspect, there is provided a method for managing battery slump in a battery-powered communication device, the method including: monitoring battery voltage level; comparing the battery voltage level with a predetermined threshold; and terminating a transmission if the battery voltage level crosses the predetermined threshold during the transmission.

In a particular case, the monitoring and/or the comparing may be performed only during the transmission In another particular case, the terminating the transmission may occur without powering down the communication device.

In yet another particular case, the monitoring may include: receiving a signal indicating a start of the transmission; receiving periodic voltage readings; and averaging the voltage readings to produce a battery voltage level.

In this case, the signal indicating the start of the transmission may be an amplifier enable signal. Also in this case, the monitoring may further include: delaying the receiving of periodic voltage readings for a predetermined time after receiving the signal indicating a start of transmission.

In still another particular case, the method may further include notifying a user of the communication device of the termination and reason for the termination.

Some of the embodiments make use of a mobile communication device, sometimes referred to herein as a mobile device, that is a two-way communication device with advanced data communication capabilities having the capability to communicate in a wireless or wired fashion with other computing devices. The mobile device may also include the capability for voice communications. Depending on the functionality provided by the mobile device, it may be referred to as a data messaging device, a cellular telephone with data messaging capabilities, a wireless Internet appliance, or a data communication device (with or without telephony capabilities). Examples of mobile communication devices include cellular phones, cellular smart-phones, wireless organizers, personal digital assistants, handheld wireless communication devices, wirelessly enabled notebook computers and the like. Typically, the mobile device communicates with other devices through a network of transceiver stations.

Figure 1:
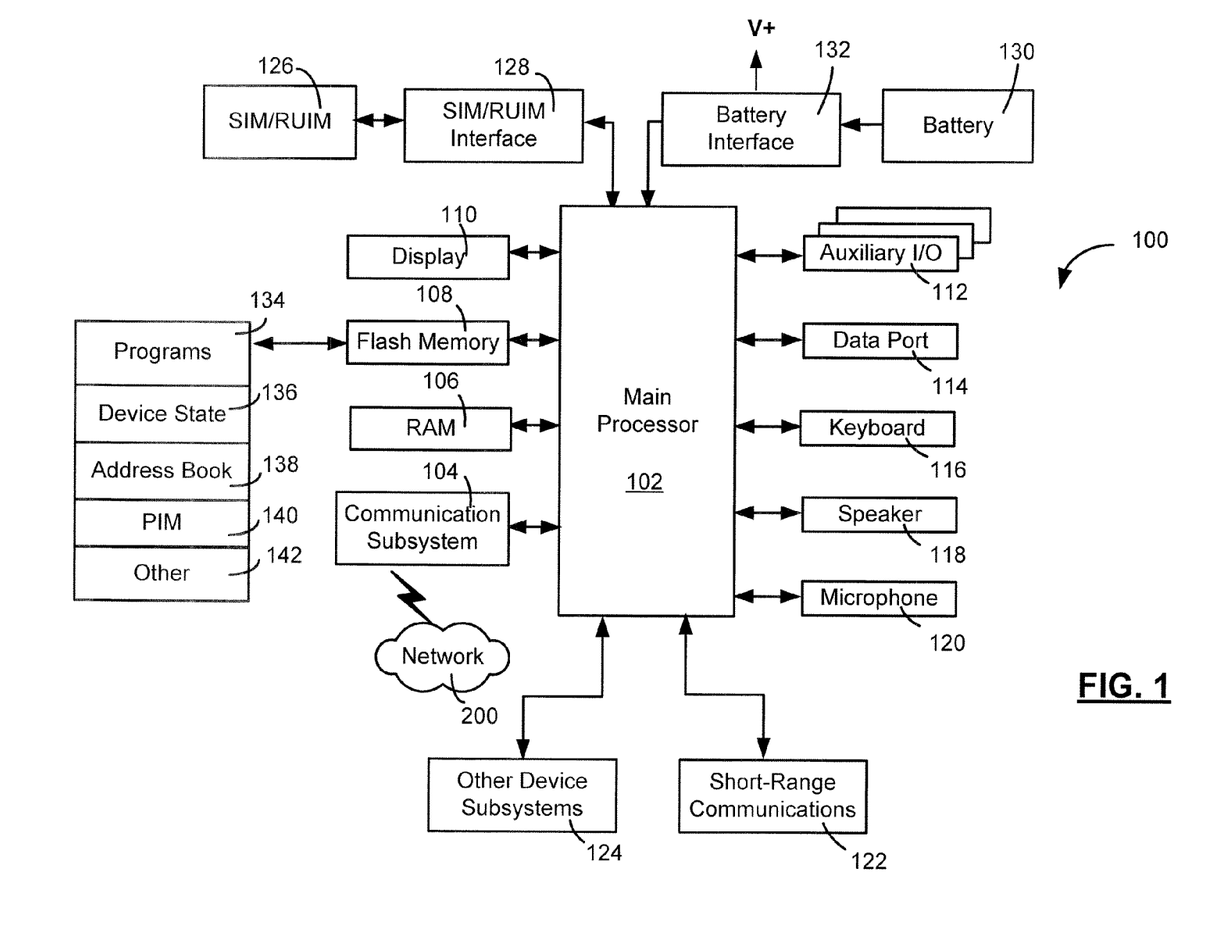
FIG. 1 is a block diagram of an exemplary embodiment of a mobile communication device.

Referring first to FIG. 1, shown therein is a block diagram of a mobile device 100 in one exemplary implementation. The mobile device 100 comprises a number of components, the controlling component being a main processor 102 which controls the overall operation of mobile device 100. Communication functions, including data and voice communications, are performed through a communication subsystem 104. The communication subsystem 104 receives messages from and sends messages to a wireless network 200. In some implementations of the mobile device 100, the communication subsystem 104 is configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), and Intelligent Digital Enhanced Network (iDEN™) standards. New standards are still being defined, but it is believed that they will have similarities to the network behavior described herein, and it will be understood by persons skilled in the art that the embodiments described herein can use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in some implementations, other wireless networks can also be associated with the mobile device 100 in other implementations.

The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, iDEN networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122, and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the main processor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 may require a SIM/RUIM card 126 (i.e. Subscriber Identity Module or a Removable User Identity Module) to be inserted into a SIM/RUIM interface 128 in order to communicate with a network. Accordingly, the SIM card/RUIM 126 and the SIM/RUIM interface 128 are entirely optional.

The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for interfacing with a battery 130. The battery interface 132 includes a power management module 500 (shown in FIG. 4), which manages power flow to/from the battery 130. The power management module 500 is described in more detail below with reference to FIGS. 4, 5, 6 and 7.

The main processor 102, in addition to its operating system functions, enables execution of software applications 134 on the mobile device 100. The subset of software applications 134 that control basic device operations, including data and voice communication applications, will normally be installed on the mobile device 100 during its manufacture. The programs 134 can include an email program, a web browser, an attachment viewer, and the like.

The mobile device 100 further includes a device state module 136, an address book 138, a Personal Information Manager (PIM) 140, and other modules 142. The device state module 136 can provide persistence, i.e. the device state module 136 ensures that important device data is stored in persistent memory, such as the flash memory 108, so that the data is not lost when the mobile device 100 is turned off or loses power. The address book 138 can provide information for a list of contacts for the user. For a given contact in the address book, the information can include the name, phone number, work address and email address of the contact, among other information. The other modules 142 can include a configuration module (not shown) as well as other modules that can be used in conjunction with the SIM/RUIM interface 128.

The PIM 140 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 may be any suitable port that enables data communication between the mobile device 100 and another computing device. The data port may be a serial or a parallel port. In some instances, the data port 114 may be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication standards include those developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
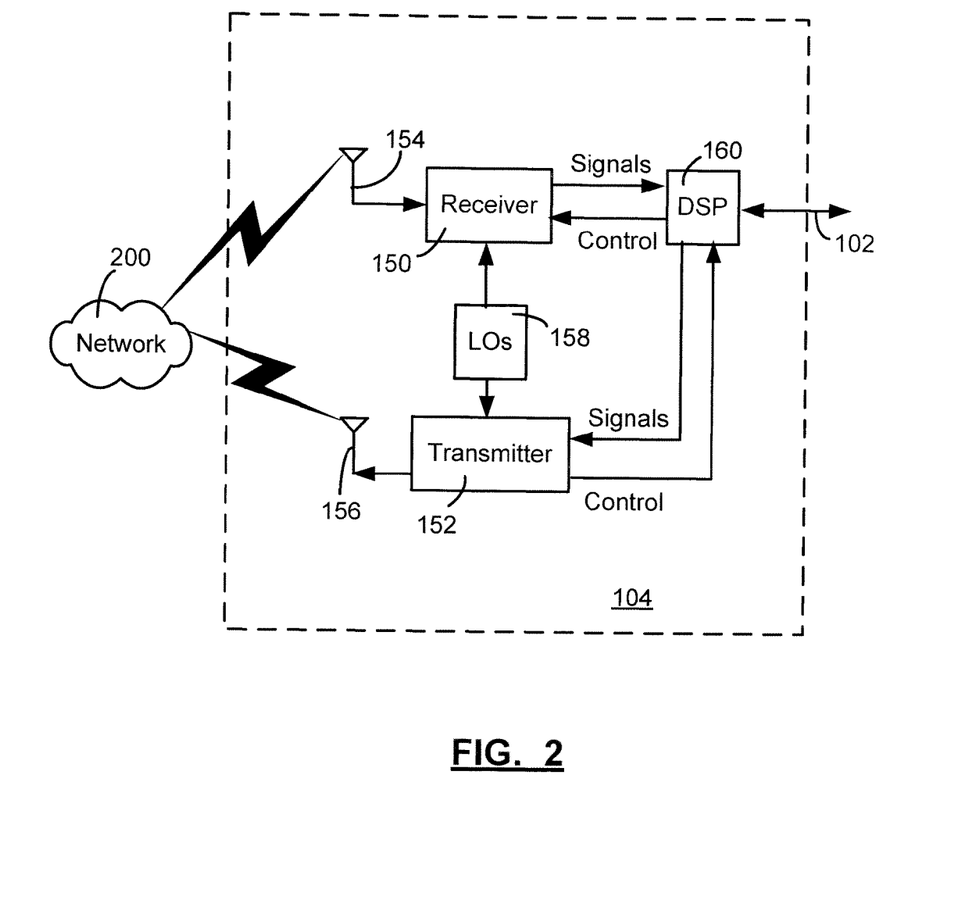
FIG. 2 is a block diagram of an exemplary embodiment of a communication subsystem component of the mobile communication device of FIG. 1.

Referring now to FIG. 2, a block diagram of an exemplary embodiment of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a communications processor 160 for wireless communication. The communications processor 160 can be a Digital Signal Processor (DSP). As will be apparent to those skilled in the field of communications, the particular design of the communication subsystem 104 can depend on the communication network with which the mobile device 100 is intended to operate. Thus, it should be understood that the design illustrated in FIG. 2 serves only as an example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor 160. In a similar manner, signals to be transmitted are processed, including modulation and encoding, by the communications processor 160. These processed signals are input to the transmitter 152 for digital-to-analog (D/A) conversion, frequency up conversion, filtering, amplification and transmission over the wireless network 200 via the antenna 156. The communications processor 160 not only processes communication signals, but also provides for receiver and transmitter control. For example, the gains applied to communication signals in the receiver 150 and transmitter 152 can be adaptively controlled through automatic gain control algorithms implemented in the communications processor 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending to the wireless network 200 and is otherwise turned off to conserve resources. Similarly, the receiver 150 is periodically turned off to conserve power until it is needed to receive signals or information (if at all) during designated time periods.

Figure 3:
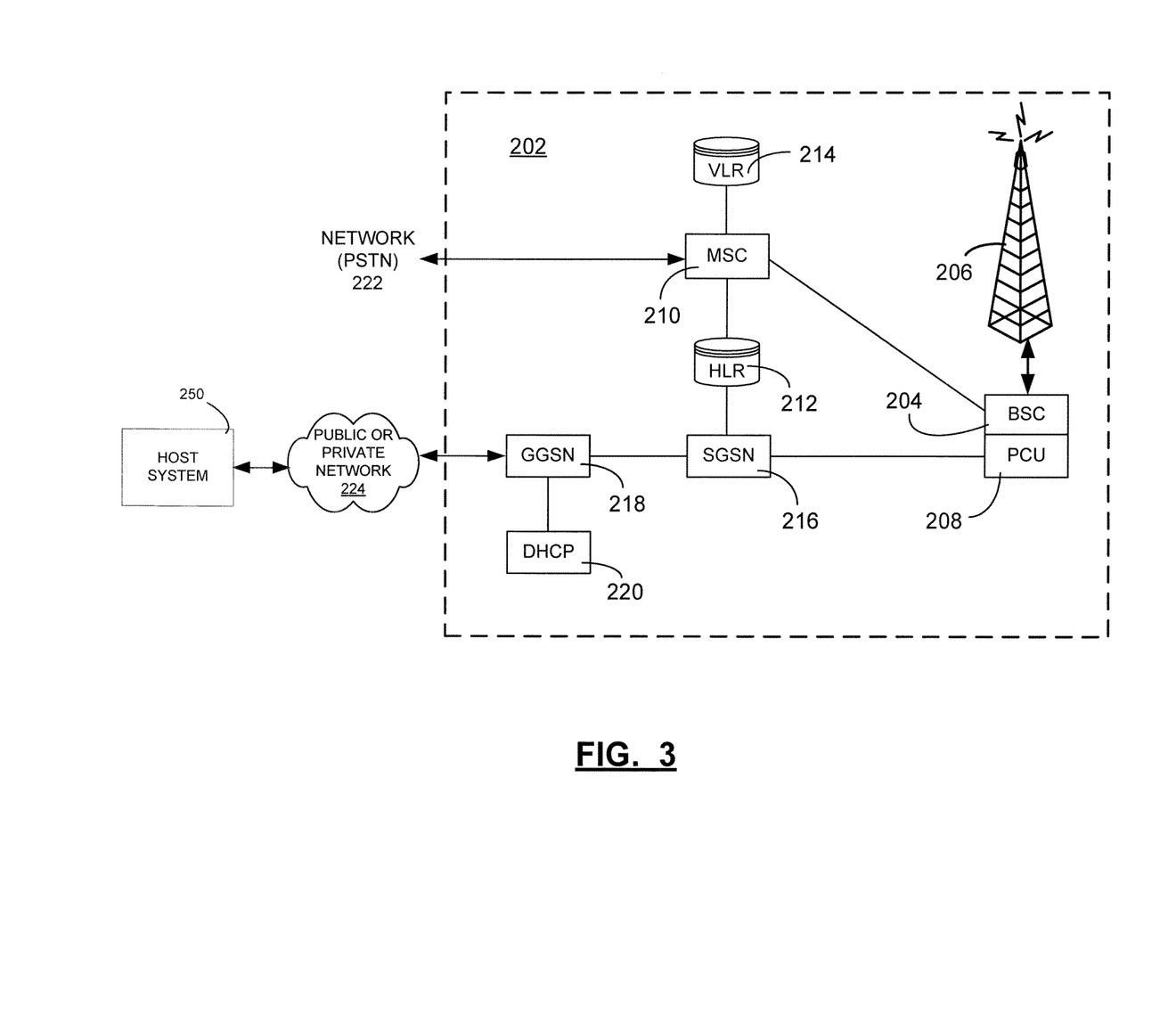

Referring now to FIG. 3, a block diagram of an exemplary embodiment of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that can be used in communications through the wireless network 200.

In a GSM network, the MSC 210 is coupled to the BSC 204 and to a landline network, such as a Public Switched Telephone Network (PSTN) 222 to satisfy circuit switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Figure 4:
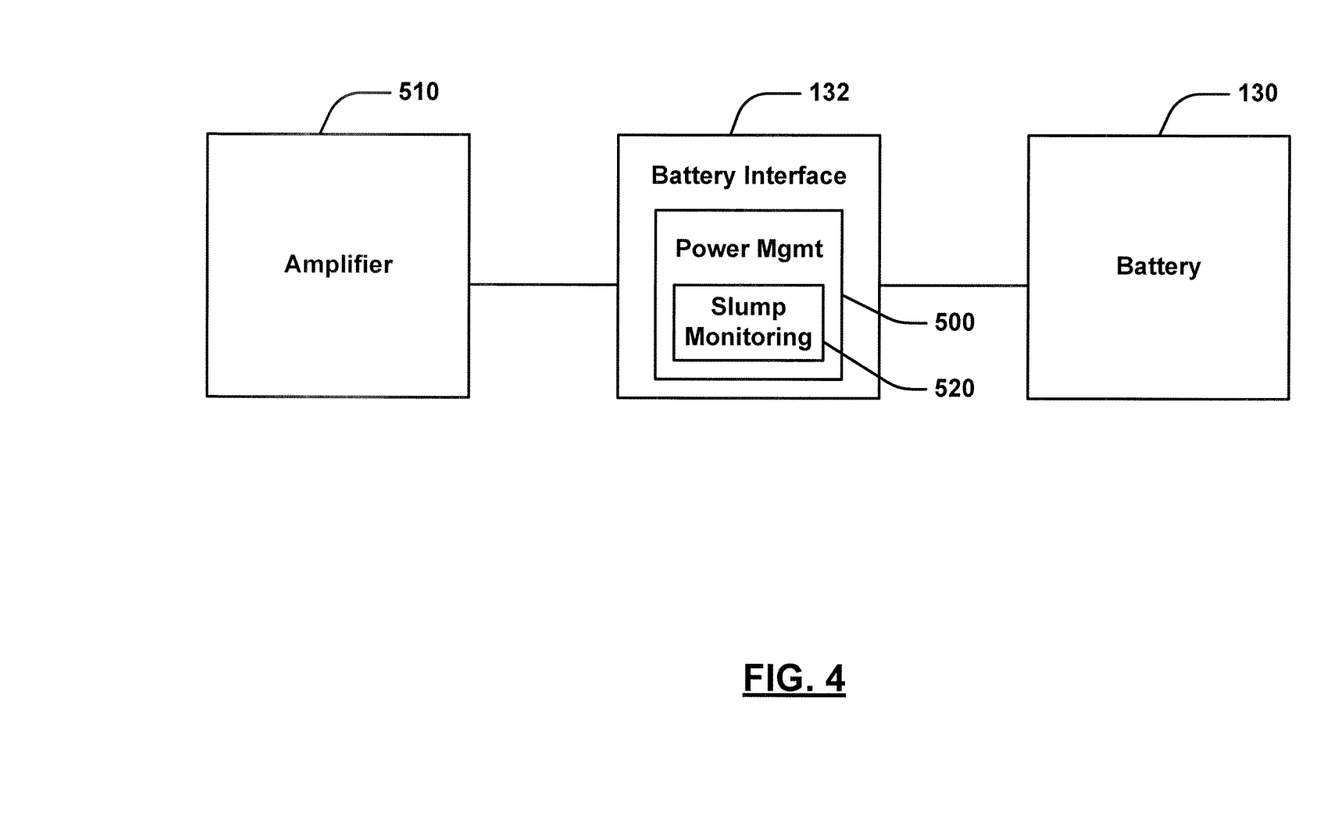
FIG. 4 is a block diagram of an exemplary embodiment of a battery interface of the mobile communication device of FIG. 1.

Having described the mobile device and its environment, the following description relates more particularly to the battery interface 132. FIG. 4 shows a schematic block diagram of the battery 130, battery interface 132 and an amplifier 510 in the transmitter 152 of the mobile device 100. The battery interface 132 includes a power management system 500, which manages the flow of power between the battery 130 and components of the mobile device 100, including the amplifier 510. As described above, the mobile device 100 generates an information signal that is transmitted using the transmitter 152. The information signal is typically a comparatively low frequency signal that is generally referred to as a baseband signal. The baseband signal is mixed with a carrier signal, typically having a substantially higher frequency, to produce a transmission signal (typically a high frequency radio signal). The transmission signal is amplified in the amplifier 510 and then applied to the antenna 156. The amplifier 510 is generally powered so that it can produce an amplified transmission signal that has the instantaneous maximum power so that it is received with little or no data loss at a remote base station or another communication device. It will be understood to one of skill in the art that the amplifier 510 may include one or more amplification stages, which may be powered or unpowered, but, for simplicity, the amplifier 510 is referred to as a single element.

In particular, the amplifier 510 must be capable of generating an amplified transmission signal such that the maximum instantaneous power level desired for any data type or data rate of the baseband data that is present in the amplified transmission signal is always accommodated without saturation or undue distortion. In conventional power management schemes, the maximum instantaneous power is directly related to available power supply voltage, such that insufficient supply voltage may induce amplifier saturation and excessive distortion. As such, the amplifier 510 is typically provided with a minimum power supply voltage that is sufficient to accommodate a specified maximum instantaneous power level without saturation or undue distortion (sometimes referred to as a "minimum voltage requirement"). However, much of the time, the actual instantaneous power level of the amplified transmission signal may be well below the specified maximum instantaneous power level, thereby leading to inefficient operation of the power amplification stage during signal transmission because the voltage supplied is thus larger than required for the transmission. The excess power supplied to the amplifier 510 is generally dissipated as heat or is otherwise lost.

When the mobile device 100 is operating using the battery 130, the power requirements of the amplifier 510 can be a heavy drain on the battery 130. For example, a GSM transmit pulse has a very high current drain on the battery 130 for a time of ~500 usec and the current can reach ~2 Amps. Such a pulse causes the voltage appearing at the amplifer 510 (sometimes referred to as the power amplifier (PA)) to "slump" because of battery internal source resistance (ISR) and other printed circuit board (PCB) trace/component resistances.

The effect of battery slump on transmission strength has led the United States Federal Communications Commission (FCC) and various standards organizations such as the Global System for Mobile communications (GSM) to include standards on trasmission quality that can be related to the minimum voltage required at the radio circuits, which can further be related to a minimum battery voltage during transmission.

In order to reduce battery capacity requirements while also meeting applicable standards, it is useful to monitor the range of battery slump and manage the mobile device 100 based on this monitoring.

In order to assist with the management of battery slump, the power management system 500 includes a slump monitoring system 520 that monitors the slump voltage of the battery 130 when feeding power to the amplifier 510 during a transmission. In this embodiment, the slump monitoring system 520 is a part of the power management system 500, however, as will be known to one of skill in the art, the slump monitoring system 520 could also be a stand-alone element. Further, it will be understood that the slump monitoring system 520 may be implemented in software or hardware, such as a circuit or chip, or some combination of hardware and software.

Figure 5:
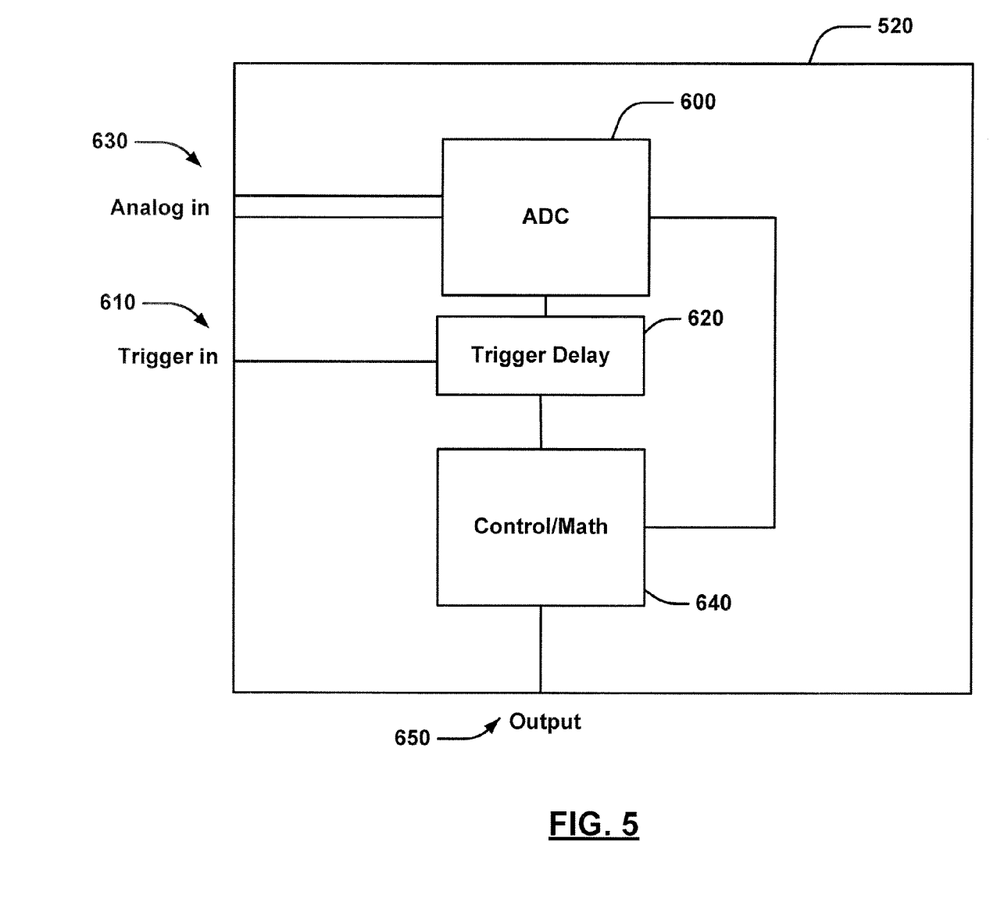
FIG. 5 is a block diagram of an exemplary embodiment of a slump monitoring system.

FIG. 5 shows a schematic block diagram of an exemplary embodiment of the slump monitoring system 520. In this embodiment, the slump monitoring system 520 includes an analog to digital converter (ADC) 600, a trigger input 610, a trigger delay 620, one or more analog inputs 630, a control/math block 640, and one or more outputs 650.

The trigger input 610, receives a signal indicating the start of transmission, for example, a system "transmit" signal from the main processor 102, a signal triggering or enabling the amplifier 510, or the like. It is convenient if a signal that is already in use within the mobile device 100 is used as the signal for the trigger delay 620 because this reduces the need for additional trigger circuitry or the like. Further, the monitoring of the battery slump only during times of high power requirements, such as transmission, reduces the load on the mobile device 100 with regard to power and processing.

The trigger input 610 is connected to the trigger delay 620, which is preferably digitally programmable, and which is further connected to the ADC 600. The trigger delay 620 provides a predetermined delay before sending a signal or signals to activate the ADC 600. This predetermined delay is provided to allow time for the battery slump to begin to have an impact on the battery voltage after the beginning of the transmission. For example, for an amplifier 510 generating a transmit pulse of approximately 500 μsec, the trigger delay 620 may be set at approximately 200-300 μsec.

The ADC 600 is also connected to the one or more analog inputs 630, which receive a signal or signals related to battery voltage level and provide these signals to the ADC 600. In some embodiments, the battery voltage may be divided or otherwise manipulated so that the signal related to battery voltage (sometimes referred to as a battery voltage signal) meets the input requirements/limitations of the ADC 600. In some embodiments, the analog inputs 630 may also include readings related to temperature, PA temperature, battery ID resistor, light sensor, or the like.

With the trigger delay 620 appropriately set the ADC 600 receives the battery voltage signal at the appropriate timing within the transmit pulse. It will be understood that, in alternate embodiments, a trigger delay 620 may not be required. However, since battery slump is unlikely to occur at the start of the transmission, some battery and computing capacity can be saved by including the trigger delay 620.

The ADC 600 is further connected to the control/math block 640. Once triggered by the trigger delay 620, the ADC 600 receives battery voltage analog signals from the analog inputs 630 and converts them to digital signals, which are sent to the control/math block 640 for processing. In the case where more than one analog input 630 is present, the ADC 600 preferably provides multiple inputs/outputs, which may be provided via multiplexing, if necessary. It will be understood that, in alternate embodiments, the analog to digital processing may also be provided external to the slump monitoring system 520 and the slump monitoring system 520 may receive digital inputs related to battery voltage levels directly into the control/math block 640. Further, functions of the control/math block 640 may be performed by other processors, including the main processor 102.

The control/math block 640 receives digital signals from the ADC 600 and processes these digital signals to monitor slump voltage values. For example, the control/math block 640 may monitor minimum or average slump voltage values. In the present embodiment, the control/math block 640 monitors an average value in order to confirm the input values. The control/math block 640 monitors slump voltage values to determine if the battery voltage level crosses a predetermined threshold, for example reaches a predetermined minimum value (i.e. a minimum threshold), during a transmit pulse. In some embodiments, the predetermined threshold may be a dynamic parameter that depends on the transmit power level required for a given transmission. For example, if the transmit power level required is lower, the corresponding battery slump would be expected to be lower and the battery 130 could drain further, allowing for longer battery life.

If the battery voltage level crosses the predetermined threshold, the control/math block 640 sends a signal to the main processor 102 to power down the transmitter 152 in order to avoid violation of relevant standards, regulations or the like. As a non-limiting example, for a transmit pulse of 500 μsec and a trigger delay 620 set at 200 μsec, the control/math block 640 may take approximately 32 measurements at 6 μsec intervals to provide an average reading. If the average reading is less than, for example, approximately 3.4V, a signal is sent via, for example, the output 650 to the main processor 102, which interrupts the transmission and then powers down the transmitter 152. In particular, the transmitter 152 may be powered down in an appropriate manner based on the particular transmission occurring. For example, if the transmission is a protocol exchange or a short data exchange, the transmitter 152 could be controlled to power down following the exchange rather than powering down immediately.

Figure 6:
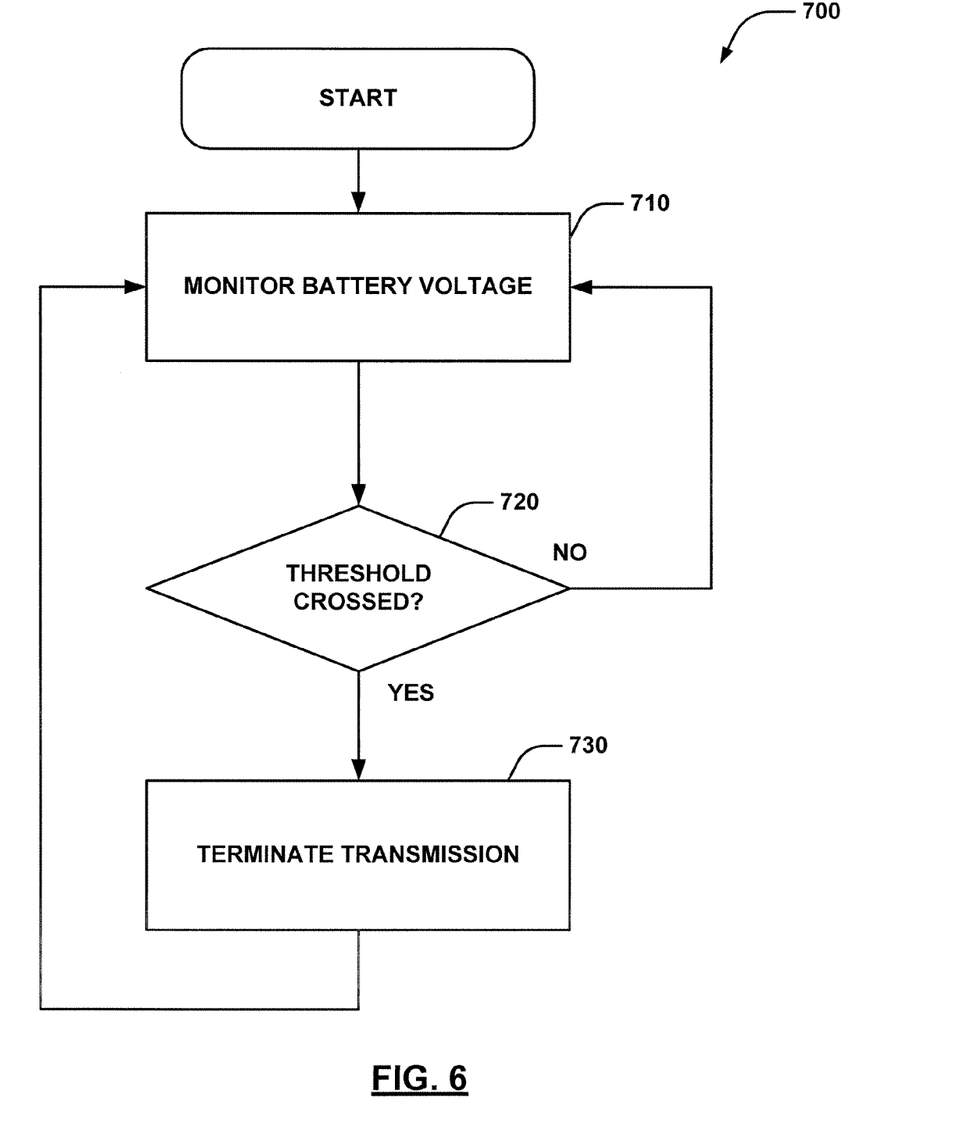
FIG. 6 is a flowchart of an exemplary embodiment of a method of slump monitoring and management.

FIG. 6 is a flowchart of a method of monitoring battery slump 700 according to an exemplary embodiment. As shown in FIG. 6, the slump monitoring system 520 monitors the battery voltage at 710. As an example using the exemplary system 520 described above, the control/math block 640 may receive signals representing the battery voltage and averages a predetermined number of measurements together (or alternatively, averages over a predetermined time or the like) to provide a value representing the battery voltage.

The slump monitoring system 520 then determines if the monitored value is below a predetermined threshold (720). As described above, the predetermined threshold may be a dynamic parameter that depends on the transmit power level required for a given transmission. If the value is below the predetermined threshold, the slump monitoring system 520 sends an interrupt signal to terminate the transmission (730), which causes the transmitter 152 to be powered down in an appropriate manner. If the monitored value is above the predetermined threshold at 750, the slump monitoring system 520 continues to monitor.

Figure 7:
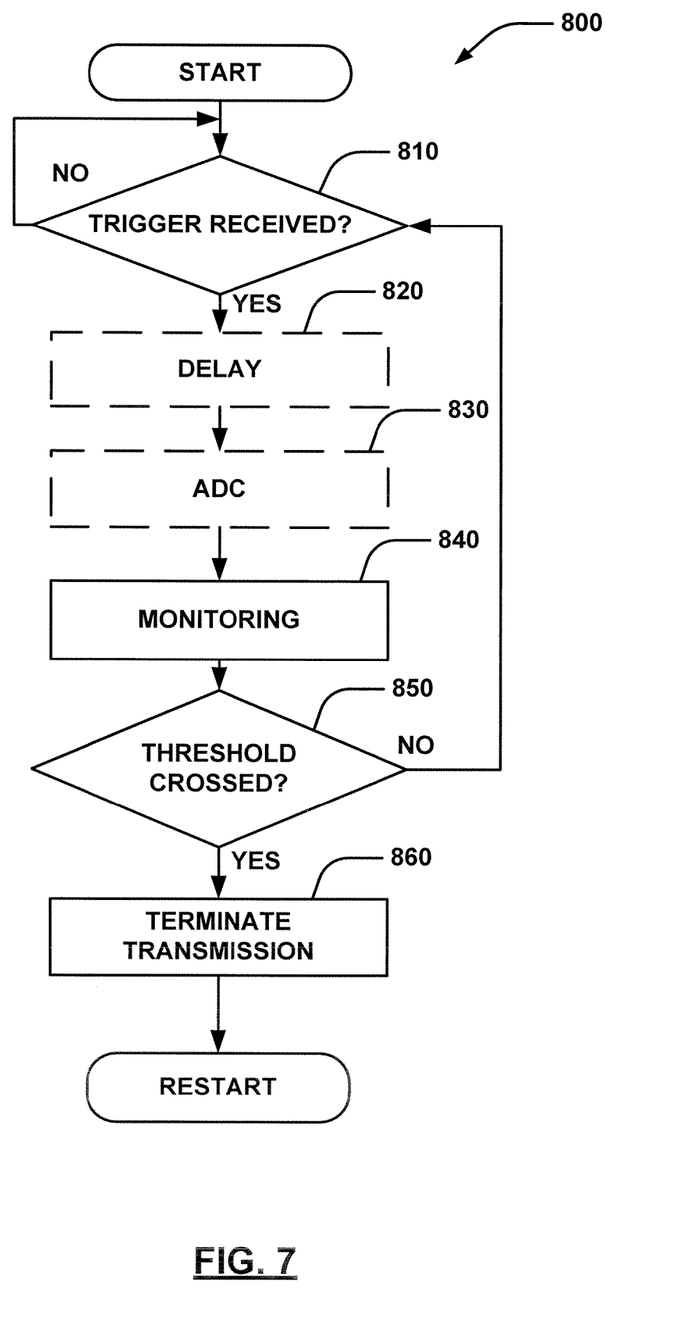
FIG. 7 is a flowchart of another exemplary embodiment of a method of slump monitoring and management.

FIG. 7 is a flowchart of a method of monitoring battery slump 800 according to another exemplary embodiment. As shown in FIG. 7, the slump monitoring system 520 waits to receive a trigger signal, for example, a transmit signal on the trigger input 610 (810). On receiving the trigger signal, the trigger delay 620 delays for a predetermined amount of time before sending a signal to start the ADC 600 (820). As described above, the trigger delay 620 may be optional in some alternative embodiments or may be external to the slump monitoring system 520 and the delay (820) is thus shown using a dotted line.

The ADC 600 receives analog signals relating to the battery voltage on the analog inputs 630, coverts the analog signals to digital signals, and sends the digital signals to the control/math block 640 (830). Similar to the case for the trigger delay 620 and as described above, the ADC 600 may be external to the slump monitoring system 520. As such, the ADC (830) is also shown using a dotted line.

The control/math block 640 receives the digital signals and averages a predetermined number of measurements together (or alternatively, averages over a predetermined time or the like) (840). The control/math block 640 then determines if the computed average is below a predetermined threshold (850). If the average is below the predetermined threshold, the control/math block 640 sends an interrupt signal on the output 650 (860), which causes the transmission to be interrupted and the transmitter 152 to be powered down. As described above, the power down sequence or process may be adjusted according to the transmission being performed.

After sending an interrupt signal, the slump monitoring system 520 may restart and continue monitoring. Preferably, the mobile device 100 will provide a user with information about the fault and advise the user of the steps needed to remedy the fault. For example, the battery 130 may need to be recharged, the environmental temperature may be too low for effective transmission, or the like. If the computed average is above the predetermined threshold at 750, the slump monitoring system 520 continues to monitor while the trigger signal is active and then returns to determine if a new trigger signal is received (710). Alternatively, the slump monitoring system 520 may continue to monitor for a predetermined time or based on other factors as will be known to one of skill in the art. For example, the slump monitoring system 520 may wait for an end of transmission signal on an input (not shown) or the like.

In alternative embodiments, the measured slump voltage may also be used to calculate internal resource resistance (ISR). ISR can be used as an indicator of battery age/life span and can be used to provide additional warnings to a user indicating when a battery should be replaced.

It should be understood that various modifications may be made to the exemplary embodiments described and illustrated herein, without departing from the general scope of the appended claims. In particular, various elements of the exemplary embodiments can be implemented in software or hardware or some combination thereof. Further, in some embodiments, the control/math block 640 may also monitor for battery voltage signals that are close to the predetermined threshold described above, for example by monitoring a second predetermined threshold, such that the control/math block 640 may send an output which can be used by the main processor 102 to notify a user that there may be difficulties with subsequent or on-going transmissions. It should also be understood that while the embodiments have been described for a mobile device, the embodiments are generally applicable to any communication or computing device that uses a battery and has a transmitter.

We claim:

1. A system for managing battery slump in a wireless communication device powered by a battery, the system comprising:
   an input signal terminal for receiving a battery voltage signal representing a battery voltage level of the battery;
   a trigger input terminal for receiving a trigger signal indicating a start of a given wireless transmission of the wireless communication device;
   an output signal terminal for sending an interrupt signal to terminate the given wireless transmission; a controller connected to each of the input signal terminal, the trigger input terminal and the output signal terminal, the controller being implemented as a processor, in circuitry or combination thereof and configured to:
   monitor the battery voltage level via the input signal terminal during the given wireless transmission after applying a delay for a predetermined period of time after the trigger signal is received via the trigger input terminal, wherein the predetermined period of time is set to a timer value that is configured to expire before the battery voltage level's slump at the start of the given wireless transmission stabilizes and the value is less than a duration of a pulse of the given wireless transmission;
   if the battery voltage level has crossed a first threshold voltage during the given wireless transmission after the delay, send an output for notifying of difficulties with the given wireless transmission; and
   if the battery voltage level has crossed a second threshold voltage during the given wireless transmission after the delay, generate and
   send the interrupt signal via the output signal terminal to terminate the given wireless transmission;
   wherein the first threshold voltage is higher than the second threshold voltage.

2. The system according to claim 1, wherein the second threshold voltage is variable depending upon a transmit power level required for the given wireless transmission.

3. The system according to claim 2, wherein the wireless communication device comprises an amplifier for amplifying the given wireless transmission of the wireless communication device, and wherein the second threshold voltage corresponds to a minimum power supply voltage required by the amplifier for the given wireless transmission.

4. The system according to claim 3, wherein the trigger signal comprises an enable signal for the amplifier.

5. The system according to claim 1, wherein the controller is configured to resume monitoring of the battery voltage level after the interrupt signal is sent.

6. The system according to claim 1, wherein the controller is configured to continue monitoring of the battery voltage level during the given wireless transmission so long as the trigger signal is active and so long as the battery voltage level has not crossed the second threshold voltage.

7. The system according to claim 1, wherein the controller is configured to send the interrupt signal without powering down the wireless communication device.

8. The system according to claim 1, wherein the controller is configured to monitor the battery voltage level by receiving periodic voltage readings of the battery via the input signal terminal, and averaging the periodic voltage readings to determine the battery voltage level.

9. The system according to claim 1, wherein the controller is configured to provide notification that the given wireless transmission has been terminated.

10. The system according to claim 1, wherein the period of time that the monitoring of the battery voltage level is delayed corresponds to a period following the start of the given wireless transmission in which the battery slump is unlikely to occur.

11. A method for managing battery slump in a wireless communication device powered by a battery, the method comprising:
receiving an indication that a given wireless transmission of the wireless communication device is occurring; monitoring a battery voltage level of the battery during the given wireless transmission after applying a delay for a predetermined period of time after receiving the indication that the given wireless transmission is occurring, wherein the predetermined period of time is set to a timer value that is configured to expire before the battery voltage level's slump at the start of the given wireless transmission stabilizes and the value is less than a duration of a pulse of the given wireless transmission; comparing the battery voltage level with a first threshold voltage during the given wireless transmission after the delay, if the battery voltage level has crossed the first threshold voltage during the given wireless transmission after the delay, send an output for notifying of difficulties with the given wireless transmission; and comparing the battery voltage level with a second threshold voltage during the given wireless transmission after the delay, if the battery voltage level has crossed the second threshold voltage during the given wireless transmission after the delay, terminating the given wireless transmission if the battery voltage level has crossed the second threshold voltage level;
wherein the first threshold voltage is higher than the second threshold voltage.

12. The method according to claim 11, wherein the second threshold voltage is variable depending upon a transmit power level required for the given wireless transmission.

13. The method according to claim 12, wherein the wireless communication device comprises an amplifier for amplifying the given wireless transmission of the wireless communication device, and wherein the second threshold voltage corresponds to a minimum power supply voltage required by the amplifier for the given wireless transmission.

14. The method according to claim 13, wherein the indication that the given wireless transmission is occurring comprises an indication that the amplifier is enabled.

15. The method according to claim 11, wherein the method further comprises resuming the monitoring of the battery voltage level after the given wireless transmission is terminated.

16. The method according to claim 11, wherein the method further comprises continuing to monitor the battery voltage level during the given wireless transmission so long as the indication that the given wireless transmission is occurring is received and so long as the battery voltage level has not crossed the second threshold voltage.

17. The method according to claim 11, wherein the given wireless transmission is terminated without powering down the wireless communication device.

18. The method according to claim 11, wherein the monitoring of the battery voltage level comprises receiving periodic voltage readings of the battery, and averaging the periodic voltage readings to determine the battery voltage level.

19. The method according to claim 11, wherein the method further comprises providing notification that the given wireless transmission has been terminated.

20. The method according to claim 11, wherein the period of time that the monitoring of the battery voltage level is delayed corresponds to a period at the beginning of the given wireless transmission in which the battery slump is unlikely to occur.

21. The system according to claim 1, wherein the predetermined period of time is in the range of 200-300 μsec.

22. The method according to claim 11, wherein the predetermined period of time is in the range of 200-300 μsec.

23. A system for managing battery slump in a communication device powered by a battery, the system comprising:
an input signal terminal for receiving a battery voltage signal representing a battery voltage level of the battery; a trigger input terminal for receiving a trigger signal indicating a start of a given transmission of the communication device; an output signal terminal for sending an interrupt signal to terminate the given transmission; a controller connected to each of the input signal terminal, the trigger input terminal and the output signal terminal, the controller being implemented as a processor, in circuitry or combination thereof and configured to:
monitor the battery voltage level via the input signal terminal during the given transmission after applying a delay for a predetermined period of time after the trigger signal is received via the trigger input terminal; wherein the predetermined period of time is set to a timer value that is configured to expire before the battery voltage level's slump at the start of the given wireless transmission stabilizes and the value is less than a duration of a pulse of the given wireless transmission;
if the battery voltage level has crossed a first threshold voltage during the given wireless transmission after the delay, send an output for notifying of difficulties with the given wireless transmission; and
if the battery voltage level has crossed a second threshold voltage during the given transmission after the delay, generate and send the interrupt signal via the output signal terminal to terminate the given transmission,
wherein the second threshold voltage is variable depending upon a transmit power level required for the given transmission; and wherein the first threshold voltage is higher than the second threshold voltage.

* * * * *